April 11, 1950 J. PAVELKA 2,503,967
TOASTER STRUCTURE
Filed Oct. 12, 1945
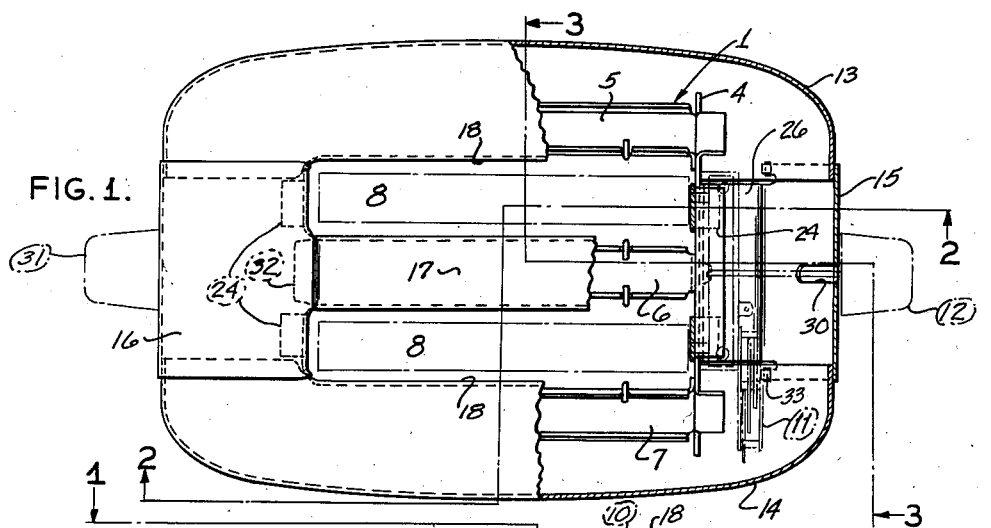
FIG. 1.
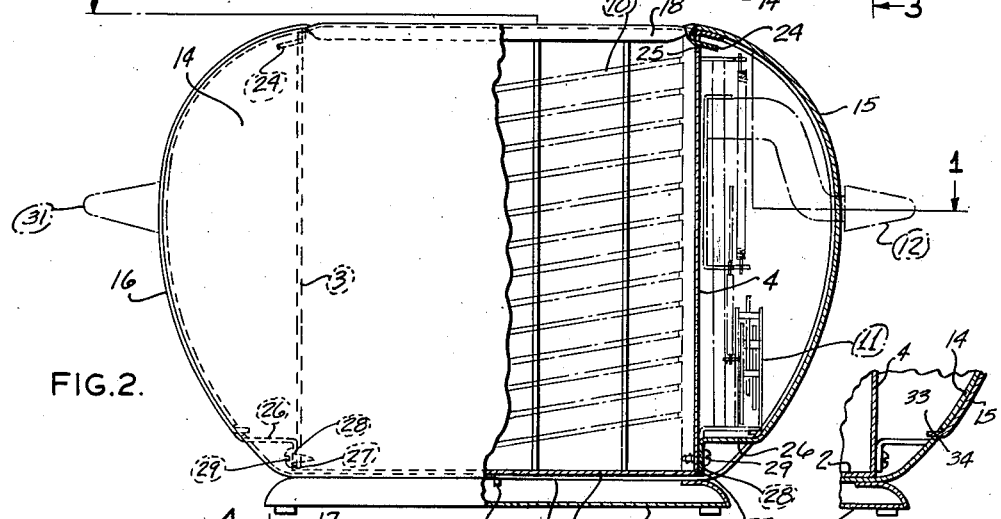
FIG. 2.
FIG. 5.
FIG. 4.
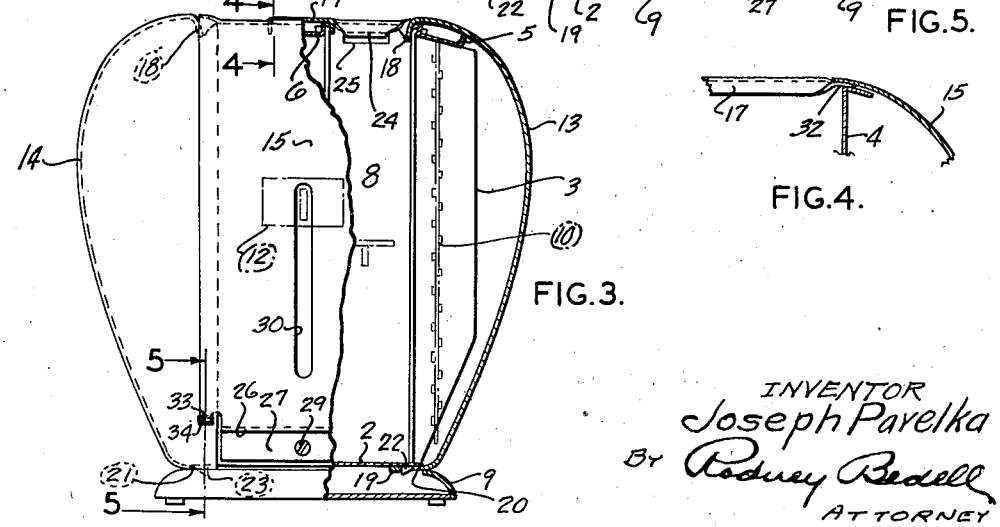
FIG. 3.
INVENTOR
Joseph Pavelka
By Rodney Bedell
ATTORNEY Patented Apr. 11, 1950

2,503,967

UNITED STATES PATENT OFFICE 2,503,967

TOASTER STRUCTURE

Joseph Pavelka, St. Louis, Mo., assignor to The Toastswell Company, Incorporated, St. Louis, Mo., a corporation of Missouri Application October 12, 1945, Serial No. 621,902

1 Claim. (Cl. 99—401)

The invention relates to electric toasters and more particularly to a housing therefor.

One object of the invention is to provide a firm, neat, serviceable housing and to facilitate and simplify the production and assembly of the several parts constituting the housing with the chassis upon which it is mounted.

Another object of the invention is to minimize waste material in stamping the several parts of the toaster housing from flat sheet material by shaping the finished parts in such manner that the blanks from which they are made are of rectangular contour and by substantially avoiding cut out sections.

Another object of the invention is to facilitate disassembly and repair of the toaster by simplifying assembly whereby a minimum number of tools is required.

These and other detailed objects of the invention as will appear from the description are attained by the structure illustrated in the accompanying drawings, in which:

Figure 1 is a top view and section of the toaster taken approximately on line 1—1 of Figure 2 and shows assembly of an end wall to the toaster chassis.

Figure 2 is a side view and section of the toaster taken approximately on line 2—2 of Figure 1 and illustrates further the manner in which the end housing wall is attached to the chassis.

Figure 3 is an end view and section taken approximately on line 3—3 of Figure 1 and shows how the housing side walls are assembled to the chassis.

Figure 4 is a detailed section taken on line 4—4 of Figure 3 and shows the manner in which the housing center strip is attached.

Figure 5 is a section taken on line 5—5 of Figure 3 and shows how the end wall of the housing engages the side wall to hold it in place on the chassis.

The toaster chassis 1 has a base plate 2, upright end plates 3 and 4, and spaced top strips 5, 6, and 7 fastened at their ends to the upper ends of upright plates 3 and 4 to form framing about slice openings 8. Fastened to base plate 2 by welding or suitable means is a base 9. Heating elements 10 and a timing mechanism 11, operated by a handle 12, are mounted on the chassis but form no part of this invention.

The toaster housing comprises a pair of dish shaped side walls 13 and 14, a pair of curved end walls 15 and 16, and a central channel strip 17, all assembled on the chassis to form a box-like structure of pleasing contour.

Side walls 13 and 14 are identical and are positioned opposite each other on the chassis. The upper marginal portions of each side wall 13 and 14 form a down-turned flange or hook 18 and these flanges engage framing strips 5 and 7. The lower marginal portion of each side wall 13 and 14 forms an inturned flange 19 which is slotted at 20 and 21, respectively, to receive projections 22 and 23 on base plate 2 to attach side walls 13 and 14 to the chassis while providing for their ready detachment as explained below. The ends of the side walls are turned in and terminate in marginal portions which are substantially flat transversely of the housing, and preferably are formed in a continuous curve vertically of the housing.

End walls 15 and 16 of the housing are positioned opposite each other between side walls 13 and 14 and are curved vertically of the housing to follow the contour of the ends of the side walls. End walls 15 and 16 preferably are flat transversely of the housing and snugly overlap the edges of side walls 13 and 14 to give a substantially flush finished appearance to the housing. Portions of the upper end of each end wall are folded back to form a pair of spaced flanges or hooks 24 which enter slots 25 on upright plates 3 and 4. The bottoms of end walls 15 and 16 are flattened at 26 and 27 and these portions of each wall are formed at substantially right angles to each other. The dimensions of flat portions 26 and 27 are such that portions 27 abut against upright plates 3 and 4 when end walls 15 and 16 are assembled to the chassis in contact with the edges of side walls 13 and 14. Portions 27 may have holes 28 therein to receive screws 29 threaded into upright plates 3 and 4, or other suitable means may be used to attach end walls 15 and 16 removably to the chassis. End walls 15 and 16 preferably have ears 33 formed thereon adjacent portions 26 and substantially parallel thereto to enter slots 34 in the inturned ends of side walls 13 and 14 to provide additional means for holding the housing together. End wall 15 is slotted at 30 to receive handle 12 which is depressed longitudinally of the slot to start a toasting cycle. End wall 16 has a handle 31 attached thereto for convenience in carrying the toaster and to add to its symmetrical appearance.

To add further to the appearance of the toaster a central strip 17 covers framing strip 6. Central strip 17 has tabs 32 at its ends extending between end walls 15 and 16 and upright plates 3 and 4, as shown in Figure 4, and the tabs may be offset below the surface of central strip 17 approximately the thickness of end walls 15 and 16 so that when the parts are assembled central strip 17 and end walls 15 and 16 present a smooth surface. Also, central strip 17 preferably is channel-shaped transversely to keep it in place on framing strip 6.

Central strip 17 and the upper flanges on sides 13 and 14 and ends 15 and 16 form the boundaries of slice-receiving openings 8 leading to the toasting chambers between heaters 10.

To assemble the toaster housing to the chassis, side walls 13 and 14 are applied by hooking flanges 18 over framing strips 5 and 7 and swinging side walls 13 and 14 downwardly around the chassis until flanges 19 spring over projections 22 and 23 on base plate 2 and slots 20 and 21 receive the projections. Central strip 17 is applied to framing strip 6. Hooks 24 on end walls 15 and 16 are inserted in slots 25 in upright plates 3 and 4, then end walls 15 and 16 are swung downwardly over the edges of side walls 13 and 14, inserting ears 33 in slots 34 of side walls 13 and 14, until flat portions 27 abut against upright plates 3 and 4, whereupon screws 29 are inserted in holes 28 and are threaded into upright plates 3 and 4. To disassemble the housing, the steps are reversed.

The five parts comprising the toaster housing are easily stamped from flat material without the use of complicated dies and they require little or no machining. Furthermore, because of their contour, there is but little material wasted in stamping the several parts.

It is possible to make the five parts from only three separate sets of dies, since the side walls are identical, and the end walls may be made identical by slotting end wall 16 similar to slot 30 in end wall 15 which receives handle 12.

The parts when assembled cooperate to constitute a firm, serviceable, neat appearing toaster housing having a bulbous appearance which would be difficult, if not impossible, to attain in a one piece stamped housing, or by using a single elongated sheet to form both sides or both ends. The parts can be assembled simply and quickly, and in the embodiment shown, only two screws are used. Obviously, should repairs need be made on the toaster, the housing can be disassembled quickly with the use of a screw driver only to permit examination of the interior of the toaster.

Details of construction may be varied substantially without departing from the spirit of the invention, and the exclusive use of such modifications as come within the scope of the claim is contemplated.

What is claimed is:

In a toaster, a chassis and a housing, the chassis including a base plate, upstanding end plates spaced apart and three parallel spaced apart strips connecting the upper portions of the end plates, the housing including spaced side walls and end walls, each having an inturned top marginal portion, the top marginal portion of each end wall being secured to the upper part of a corresponding one of said end plates, and the top marginal portion of each side wall being secured to a corresponding one of said strips, a separate finish strip overlying the middle one of said strips, the edges of said finish strip and of the upper ends of said walls defining toaster receiving slots in the housing.

JOSEPH PAVELKA.

REFERENCES CITED

The following references are of record in the file of this patent:

UNITED STATES PATENTS

| Number | Name | Date |
|---|---|---|
| 1,741,791 | Reck | Dec. 31, 1929 |
| 2,151,105 | Henderskot et al. | Mar. 21, 1939 |
| 2,285,141 | Biebel | June 2, 1942 |
| 2,368,026 | Jepson | Jan. 23, 1945 |
| 2,379,709 | Heilman | July 3, 1945 |